July 19, 1955 W. H. SILVER ET AL 2,713,295
LIFTING AND LEVELING MECHANISM FOR TRACTOR PLOWS
Filed Dec. 29, 1949 3 Sheets-Sheet 1

*INVENTORS*
WALTER H. SILVER
WILLIAM V. LOHRMAN
BY
ATTORNEYS

July 19, 1955  W. H. SILVER ET AL  2,713,295
LIFTING AND LEVELING MECHANISM FOR TRACTOR PLOWS
Filed Dec. 29, 1949  3 Sheets-Sheet 2

INVENTORS
WALTER H. SILVER
WILLIAM V. LOHRMAN
BY
ATTORNEYS

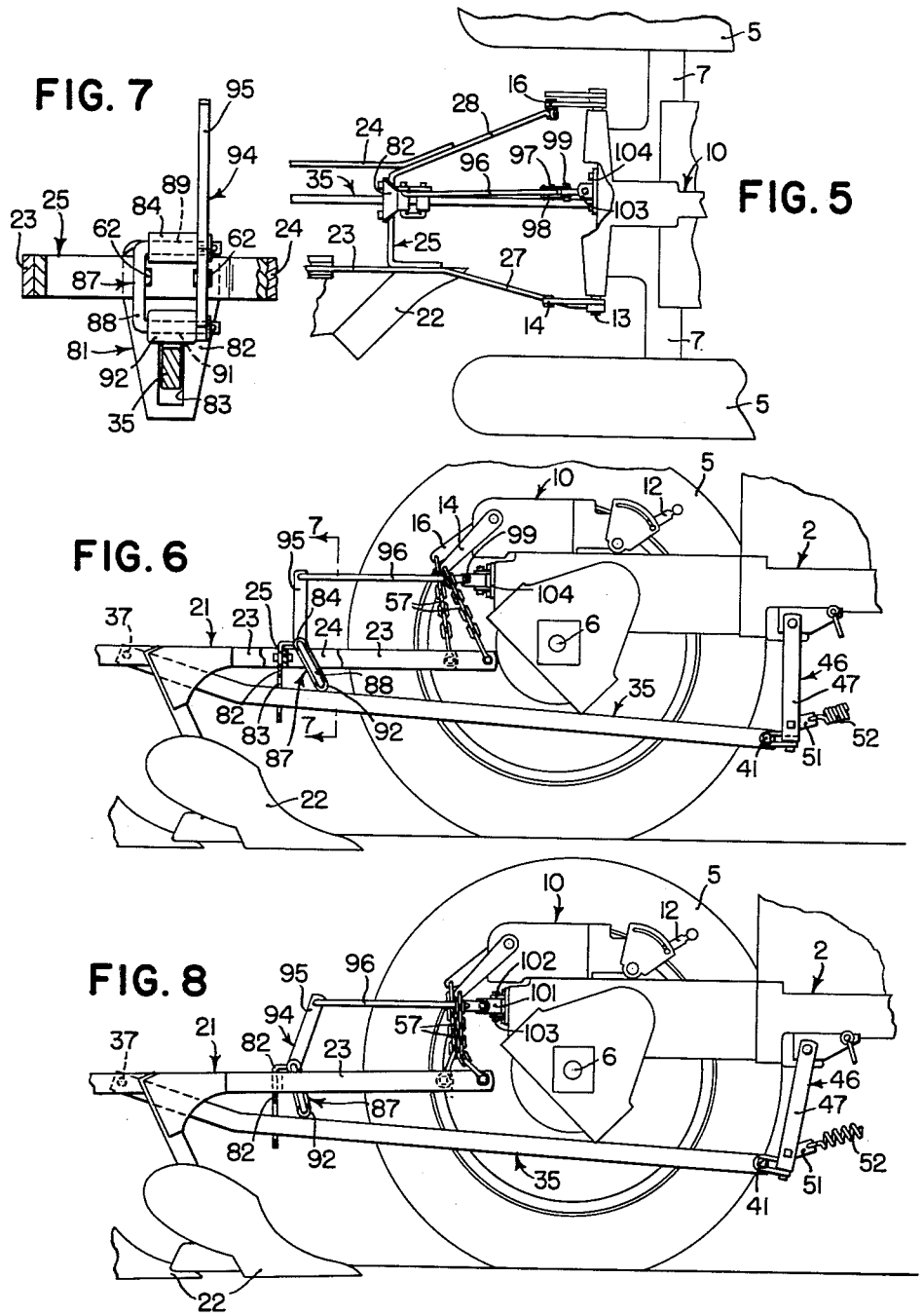

United States Patent Office 2,713,295
Patented July 19, 1955

2,713,295

LIFTING AND LEVELING MECHANISM FOR TRACTOR PLOWS

Walter H. Silver, Moline, Ill., and William V. Lohrman, Davenport, Iowa, assignors to Deere & Company, Moline, Ill., a corporation of Illinois Application December 29, 1949, Serial No. 135,641

17 Claims. (Cl. 97—46.39)

The present invention relates generally to agricultural implements and more particularly to ground-working implements, such as plows or the like, adapted to be hitched to a farm tractor.

The object and general nature of the present invention is the provison of a plow of the integral type, that is, an implement that is adapted to be carried entirely by the tractor during transport, and more particularly it is a feature of this invention to provide a tractor plow having new and improved means providing for its leveling as well as for the raising and lowering of the plow into and out of transport position. Further, it is a feature of this invention to provide a tractor plow having overload responsive means whereby the depth of plowing is automatically reduced upon the occurrence of an overload.

These and other objects and advantages of the present invention will be apparent to those skilled in the art after a consideration of the following detailed description, taken in conjunction with the accompanying drawings, in which:

Figures 5 and 6 are fragmentary plan and side views showing a modified form of the present invention wherein the depth of plowing is automatically reduced under conditions of overload.

Figure 7 is a sectional view taken generally along the line 7—7 of Figure 6.

Figure 8 is a fragmentary side view showing the action of the depth control mechanism in decreasing the depth of operation under an overload.

Figures 1, 3, 4:
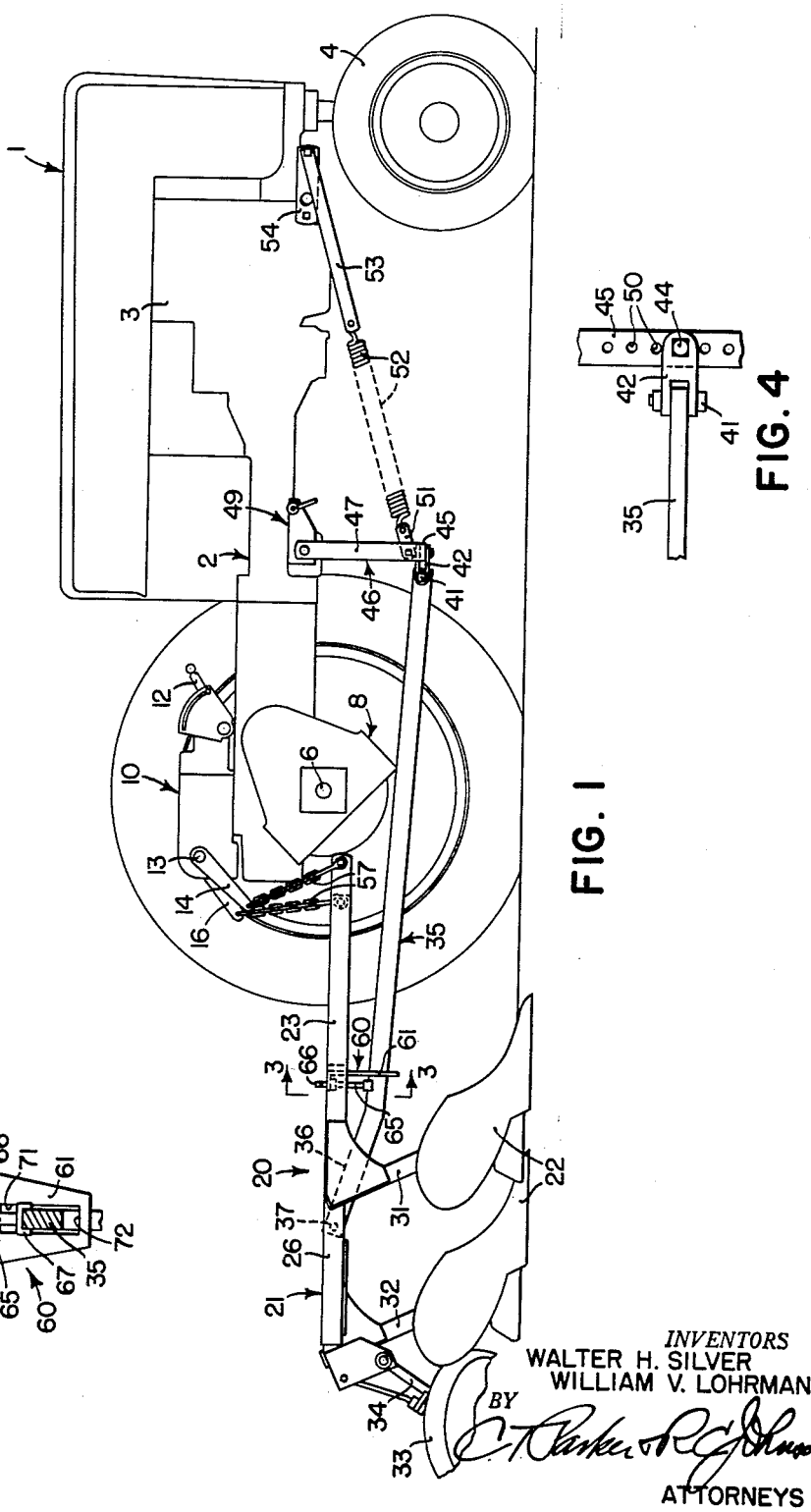
Figure 1 is a side view of a tractor plow in which the principles of the present invention have been incorporated.
Figure 3 is a detail sectional view taken generally along the line 3—3 of Figure 1, showing the means provided for adjusting the position of the depth-controlling stop.
Figure 4 is a detail view showing the provision for landing adjustment at the front end of the plow beam.
Figure 2:
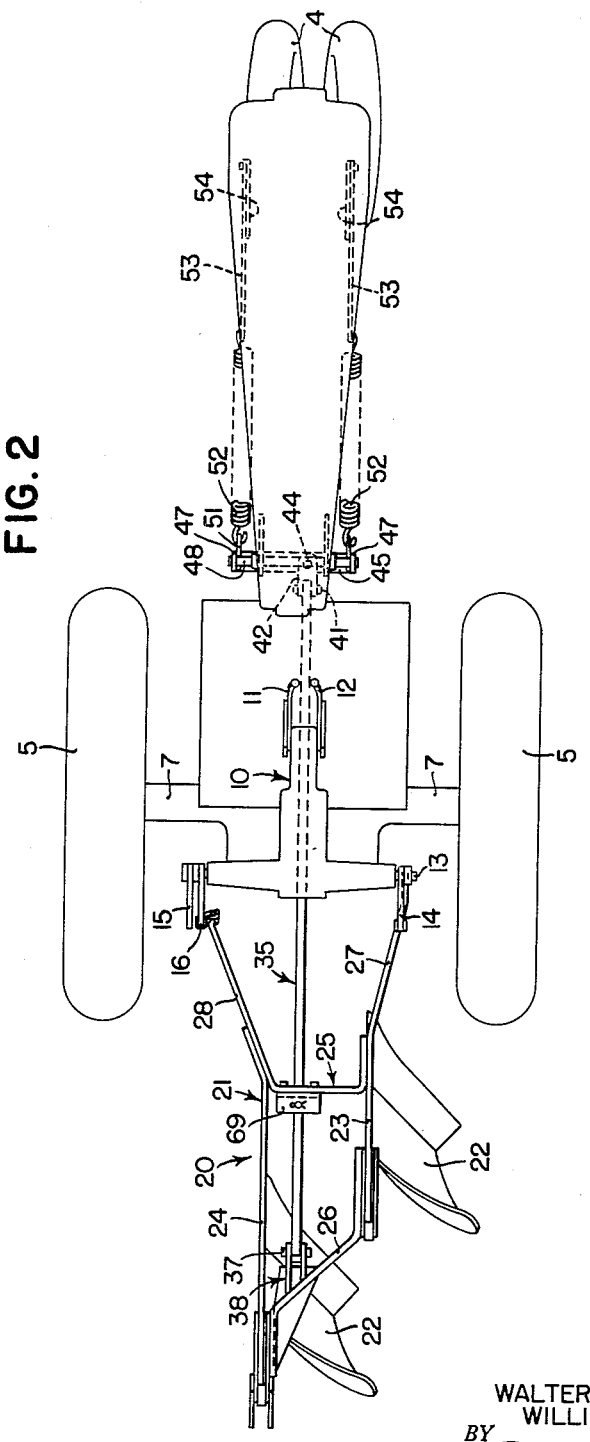
Figure 2 is a plan view of the outfit shown in Figure 1.

Referring now to the drawings, particularly Figures 1 and 2, the tractor to which the plow of the present invention is connected is indicated in its entirety by the reference numeral 1 and, so far as the present invention is concerned, is largely conventional. The tractor 1 includes a frame 2 carrying a power plant 3 and supported on a pair of closely spaced front wheels 4 and a pair of laterally spaced apart rear or driving wheels 5. The latter are carried on axle shafts 6 which are rotatable in axle housing 7 forming a part of a rear axle structure 8 of the tractor. The tractor 1 is also provided with a power lift mechanism 10 which includes a pair of hydraulically operated ram units controlled individually by valve levers 11 and 12. One of the power lift units includes a transverse rock-shaft 13 to which a pair of power lift arms 14 and 15 are fixed. The other power lift unit has its ram connected to operate a power lift arm 16 movable independently of but mounted closely adjacent to the left-hand power lift arm 15, as best shown in Figure 2. The present invention is not concerned with the particular details of the power lift mechanism, and hence further description is believed to be unnecessary. Generally speaking, the power lift mechanism is substantially like that shown in the U. S. Patent to Brown 2,363,292, dated November 21, 1944, to which reference may be had if necessary.

The plow in which the principles of the present invention have been incorporated is indicated in its entirety by the reference numeral 20 and comprises a frame 21 and a pair of moldboard-type furrow openers 22 disposed in laterally and fore and aft spaced apart relation. The plow frame 21 includes a right-hand beam 23 and a left-hand beam 24 suitably interconnected by braces 25 and 26. The forward brace 25 includes forwardly extending right- and left-hand portions or sections 27 and 28. The rear ends of the beams 23 and 24 carry downwardly extending standards 31 and 32 to which the plow bottoms 22 are connected. A rolling landside 33 is connected by crank axle means 34 with a rear portion of the frame 21.

A draft beam 35 is provided at its rear end with a rearwardly and upwardly extended portion 36 which is pivoted, as at 37, to a bracket 38 fixed rigidly to the rear brace bar 26. The forward end of the draft bar or beam 35 extends forwardly underneath the tractor and at its forward end is provided with an enlarged opening to receive a transverse draft pin 41 which connects the front end of the beam 35 to a swivel member 42 that is connected for lateral swinging movement about a generally vertical axis by a hitch pin 44 to a transversely disposed draft bar 45. The bar 45 is carried by a bracket structure 46 which includes a pair of depending arms 47 which at their upper ends are fixed to a cross shaft 48 that is rockably mounted in an attaching bracket 49 adapted to be carried by the tractor in any suitable way. The lower end of each of the arms 47 is provided with an apertured lug 51, and connected to each of the lugs 51 is a heavy cushion spring 52. The forward ends of the springs 52 are connected to the front portion of the tractor by a pair of draft straps 53 and a pair of attaching brackets 54. The front end of the right-hand forwardly extending frame section 27 is connected by a generally upwardly extending chain 57 to the right-hand power lift arm 14 and the front end of the left-hand frame extension 24 is apertured to receive another chain 57 which connects the left-hand portion of the plow frame 21 with the left-hand independently operated power lift arm 16. Movement of the right-hand power lift valve lever 12 controls the right-hand power lift arm 14 and movement of the left-hand power lift valve lever 11 controls the left-hand power lift arm 16.

Movement of the plow frame 21 relative to the draft bar or beam 35 is controlled by stop means indicated in its entirety by the reference numeral 60. As best shown in Figures 1 and 2, the stop means 60 comprises a vertical bracket plate 61 fixed, as by bolts 62, to the brace member 25. The upper portion of the plate 61 above the attaching bolts 62 carries a rearwardly directed angle portion 64 which is apertured to loosely receive a vertically disposed part 65 which includes a shank 66 threaded at its upper end and carrying a saddle member 67 at its lower end. On the threaded portions is a lock nut 68, and the upper end of the shank 66 is apertured to receive a cotter 69. The stop plate 61 is slotted, as at 71, and the beam 35 extends through the slot 71. As will be clear from Figure 1, the part 65 constitutes an upper stop, engageable with the upper edge of the draft bar 35, and the slotted member 61 constitutes a lower stop engageable with the lower edge of the draft bar 35. The form of the invention shown in Figure 7 and described below includes a similar stop arrangement. By changing the position of the lock nut 68 on the shank 66, the uppermost position of the draft beam 35 relative to the forward portion of the frame 21 may be varied, as desired.

In operation, the pressure of the soil against the lower portions of the furrow openers 22 acts to rock the plow as a unit about the transverse axis established by the pivot 37 relative to the beam 35, but this movement is limited by the engagement of the stop saddle 67 with the upper edge of the bar 35. Contact between the beam or bar 35 and the stop saddle 67 is maintained substantially at all times during operation and the plow as a whole can swing upwardly or downwardly relative to the tractor about a forward transverse axis established by the pivot 41. The draft bar 35 may also move relative to the swivel member 42 about a generally fore and aft extending axis, since the hole in the forward end of the draft bar or beam 35 is larger than the pin 41. Further, the plow as a unit may swing relative to the tractor about the vertical axis established by the vertical hitch pin 44. So long as the stop saddle 67 lies against the upper edge of the bar 35, the plow may be raised and lowered relative to the tractor by operating both the valve levers 11 and 12 at the same time. In this way, the rear wheels of the tractor serve as a gauge for determining the depth of operation of the plow bottoms 22. Further, the plow may be leveled, that is, it may be swung about a generally fore and aft extending axis, by operating one or the other of the power lift arms 14 and 15 in one direction or the other, as desired.

When it is desired to lift the plow into a transport position, both valve levers 11 and 12 are moved forwardly into the full lift position. The resulting upward movement of the power lift arms 14 and 15, which occurs simultaneously, acts against the frame extensions 27 and 28 to pivot the plow frame about the axis 37, which has the effect first, of raising the points of the plow bottoms so as to cause the plow to tend to run out of the ground, and, second, such upward movement of the front end of the plow frame acts against the rolling landside 33 as a fulcrum to raise the plow. The slot 71 is of sufficient length so that there is some lost motion between the lower edge of the plow beam 35 and the lower end of the slot 71, as indicated by the reference numral 72 in Figure 3. Therefore, the first upward movement of the power lift arms 14 and 15 serves primarily to control the depth of operation, but if the arms 14 and 15 are moved to their full upper position the front end of the plow frame 21 is raised until the lower end 72 of the slot 71 engages the lower edge of the beam 35, and then the entire plow is lifted as a unit relative to the tractor about the transverse axis 41.

It will be noted from Figures 1 and 2 that the right-hand frame extension 27 is slightly longer, that is, it extends forward somewhat farther than the left-hand frame extension 28. The purpose of this arrangement is to provide a somewhat greater range of depth adjusting movement for the right-hand power lift arm 14, with which the longer frame extension 27 is associated, this being necessary or at least desirable by virtue of the fact that in normal plowing the right-hand portion of the plow frame is raised, relative to the tractor, to a greater extent than the left-hand portion, since in normal plowing the right-hand rear wheel of the tractor runs in the previously opened furrow. If desired, however, the two lifting and depth controlling chains 57 may be connected to the plow frame at transversely alined points. The bar 45 to which the draft clevis 42 is connected by the pin 44 is provided with a plurality of openings 50 so that the part 42 may be connected to the bar 45 at any one of a number of laterally spaced apart points whereby the proper landing of the plow may be effected. This arrangement is best shown in Figure 4.

Instead of the adjustably fixed type of stop, best shown in Figure 3, for controlling the depth of operation of the plows, an automatically adjustable stop, responsive to rearward yielding of the hitch member, as under an overload, may be employed. Figures 5–7 show a form of automatically adjustable stop, and this form of the invention will now be described.

The slotted bracket plate 61 of Figures 1–3 is, in this form of the invention, replaced by a bracket structure 81 which includes a generally vertically disposed plate 82, slotted, as at 83, and having a bearing sleeve 84 fixed to the forwardly curved portion of the plate 82. The bearing sleeve 84 is disposed transversely of the plow when the bracket 82 is fixed to the cross brace structure 25, as by the same bolts 62 which fix the bracket structure 60 to the plow in the form of the invention shown in Figures 1–3. A stop bail member 87 is swingably mounted on the bearing sleeve 84 and, as best shown in Figure 7, comprises a U-shaped bail 88 having its upper end 89 rockably mounted in the sleeve 84 and at its lower end 91 carrying a beam-engaging roller 92. A bail strap member 94 is apertured to receive the ends of the bail sections 89 and 91, and the strap member 94 is extended upwardly, as at 95, and apertured to receive the rear laterally turned end of a controlling link 96. The strap member 94 is held in place on the bail member 88 by means of cotters or the like. Similarly, the rear end of the controlling link member 96 is held in position connected with the upper end 95 of the bail strap member 94 by means of a cotter or the like. The forward end of the link member 96 is apertured to receive right- and left-hand connecting straps 97 and 98 which are pivoted, as at 99, to a swivel member 101 which is mounted for lateral swinging on a vertical pivot 102 carried by a pair of lugs 103 fixed in vertically spaced relation on an attachment plate 104 that is adapted to be fixed to the rear portion of the tractor in any suitable way.

In this form of the invention, whenever the plows become subjected to an overload, as by operating too deep for the soil conditions encountered, the hitch springs 52 yield and the hitch member 46 swings rearwardly relative to the tractor. This permits the entire plow to shift rearwardly relative to the tractor, and since the upper end of the bail strap member 95 is connected with the rear portion of the tractor by the link 96, this rearward shifting of the plow frame relative to the tractor causes a clockwise movement of the stop bail 87, and this member, in turn, acts through the roller 92 against the beam 35 to raise the forward portion of the plow frame relative to the beam, and thus elevates the points of the plow bottoms and causes them to move into a position of decreased depth. If the abnormal conditions are encountered only momentarily, the parts will automatically resume their normal position as soon as the abnormal loads are reduced. The link 96 may be adjustable in length, if desired.

While we have shown and described above the preferred structure in which the principles of the present invention have been incorporated, it is to be understood that our invention is not to be limited to the particular details, shown and described above, but that, widely different means may be employed in the practice of the broader aspects of our invention.

What we claim, therefore, and desire to secure by Letters Patent is:

1. A plow adapted to be connected with a tractor, comprising a plow frame having a pair of laterally spaced apart sections, one or more furrow openers carried by said frame, a rigid draft beam pivotally connected at its rear end with said frame at a point rearwardly of said sections and above said furrow openers and adapted to be pivotally connected at its forward end with the tractor, abutment means carried by said frame at points above and below the draft beam for limiting movement of the plow frame relative thereto, and control means adapted to be mounted on the rear of the tractor above and connected with said sections for raising and lowering the front end of the plow frame relative to said draft beam.

2. A plow adapted to be connected with a tractor having power actuated means including a pair of power operated arms movably mounted on the rear of the tractor in laterally spaced apart relation, said plow comprising a plow frame having a pair of laterally spaced apart, forwardly extending sections, one or more furrow openers carried by said frame, the forward ends of said sections lying forwardly of said furrow openers when the the plow is connected with the tractor, a draft beam pivotally connected at its forward end with the tractor, means pivotally connecting the rear end of the draft beam to the plow frame at a point above said furrow openers and rearwardly of said forward sections, abutment means carried by said frame at points above and below the draft beam for limiting movement of the plow frame relative thereto, and a lifting connection between each of said forward frame sections and the associated tractor power actuated arm at the same side of the tractor.

3. A plow comprising a frame, furrow opening means carried thereby, a draft bar adapted to extend in a fore and aft direction and pivotally connected at its rear end with said plow frame, means for pivotally connecting the forward end of said bar with a tractor or the like, a pair of laterally spaced apart portions connected rigidly with said plow frame and extending forwardly therefrom, an upwardly extending connection fastened at its lower end to each of said forwardly extending portions, and a pair of separately operable raising and lowering means connected, respectively, with the upper portions of said connections.

4. A two-bottom plow comprising a plow frame, a pair of furrow openers carried by said frame, a draft bar adapted to extend in a fore and aft direction, pivot means for swingably connecting the rear end of said draft bar with said frame at a point between said furrow openers, whereby the plow frame may pivot about a generally transverse axis relative to said draft bar, means for pivotally connecting the forward end of said bar with a tractor or the like, said plow frame including a pair of laterally spaced apart frame portions disposed forwardly of said pivot means, a pair of raising and lowering means, fore-and-aft shiftable means connecting said raising and lowering means, respectively, with said laterally spaced apart portions at points forward of said transverse axis for shifting said plow frame about said transverse axis to change the angle between said furrow openers and the ground, and stop means acting between said plow frame and said draft bar for limiting the upward swinging of the forward portion of said plow frame about said axis relative to said draft bar, whereby further upward movement of said raising and lowering means, after said stop means limits movement of said plow frame relative to said draft bar, raises said plow frame and draft bar together about the point of connection of the draft bar with the tractor.

5. A plow adapted to be connected with a tractor, comprising a plow frame, furrow opener means carried thereby, a draft bar pivotally connected at its rear end with said frame generally at a point above the lower ground-engaging portions of said furrow opener means for swinging movement in a generally vertical plane about a transverse axis passing through said point, means for pivotally connecting said bar at its forward end with the tractor, a generally vertically extending, fore-and-aft shiftable connection between the tractor and the plow frame forwardly of said transverse axis, whereby an upwardly directed force acting through said connection against the plow frame serves to swing the forward part of the latter upwardly about said axis, and stop means acting between said plow frame and said draft bar at upper and lower points thereon for limiting the vertical movement of the latter relative to said draft bar, said stop means including bar-engaging parts spaced apart to accommodate a limited amount of movement of the plow frame relative to said draft bar about said transverse axis.

6. A plow comprising a plow frame, one or more furrow openers connected thereto, a draft bar pivotally connected at its rear end to said frame generally above said openers and rearwardly of the forward end of said frame, a first stop means acting between said frame and said bar forward of the pivot connection of the latter with said frame for limiting the downward movement of the forward part of the frame relative to said bar, a second stop means acting between the frame and said bar for limiting the amount of upward movement of the forward part of the frame relative to the draft bar, and lifting means connected with the forward portion of said frame for lifting the latter and acting through said stop means for raising the rear portion of said draft bar.

7. The invention set forth in claim 6, further characterized by means connected with the draft bar and yieldable in proportion to the magnitude of the draft pull, and means connected to be actuated by said yieldable means for changing the position of said first stop means.

8. The invention set forth in claim 3, further characterized by cushion spring hitch means for connecting the forward end of said draft bar with the tractor and adapted to yield rearwardly under an overload, shiftable stop means connected between said frame and draft bar and including a part limiting the movement of the plow frame downwardly relative to said draft bar, and means responsive to a rearward movement of said hitch means relative to the tractor for changing the position of said part.

9. The invention set forth in claim 8, further characterized by said part comprising a bar-engaging part movably mounted on said frame.

10. The invention set forth in claim 9, further characterized by said bar-engaging part being pivoted to the plow frame, and means connected between said pivoted part and the tractor whereby when said plow frame and draft bar move rearwardly in response to a yielding of the hitch device, said stop part is moved downwardly relative to said frame so as to raise the forward portion of the frame relative to the draft bar and thus reduce the depth of operation.

11. For use with a tractor having a pair of separately operable power lift means and a rearwardly shiftable cushion spring hitch unit, the improvement which includes an agricultural implement comprising a frame having ground-working means, a pair of laterally spaced apart frame sections carried by said frame, a draft bar pivotally connected at its rear end to said frame generally above said ground-working means and rearwardly of the forward portions of said laterally spaced apart frame sections, whereby said frame is swingable about a transverse axis relative to the draft bar to angle the ground-working means downwardly when said frame sections are swung downwardly toward the draft bar, vertically shiftable stop means carried by said frame and acting between the latter and said draft bar forward of the pivot connection of the latter with said frame for limiting the upward movement of the implement frame relative to said draft bar, a draft connection extending between the forward end of said draft bar and the tractor for transmitting draft between the draft bar and the tractor, and lifting connections extending, respectively, between the forward portions of said laterally spaced apart frame sections and said pair of separately operable power lift means on the tractor.

12. The invention set forth in claim 11, further characterized by said draft connection including yieldable means, whereby the implement may shift rearwardly, relative to the tractor, under overload conditions, and means responsive to the rearward movement of the implement relative to the implement frame for adjusting the position of said stop means.

13. A plow comprising a plow frame, one or more furrow openers connected thereto, a draft bar pivotally connected at its rear end to said frame generally above said openers and rearwardly of the forward end of said frame for movement relative to the latter about a transverse axis, a bracket fixed to said frame above said bar and forward of said axis, said bracket carrying a downwardly extending portion engageable with the lower edge of said bar for limiting the upward swinging of the forward portion of the frame about said axis relative to said bar, a generally vertically adjustable part carried by said bracket and engageable with the upper edge of said bar for limiting the downward swinging of the front portion of the frame relative to said draft bar, and lifting means connected with the forward portion of said frame for lifting the latter and acting through said bracket for raising the rear portion of said draft bar.

14. A plow as defined in claim 13, further characterized by yieldable hitch means for connecting the plow to a tractor, and means responsive to relative movement between the plow and tractor and connected with said adjustable part for changing the position of the latter in response to yielding of said hitch means.

15. A plow comprising a plow frame, one or more furrow openers connected thereto, a draft bar pivotally connected at its rear end to said frame generally above said openers and rearwardly of the forward end of said frame for movement relative to the latter about a transverse axis, a bracket fixed to said frame above said bar and forward of said axis, said bracket carrying a downwardly extending portion engageable with the lower edge of said bar for limiting the upward swinging of the forward portion of the frame about said axis relative to said bar, a generally vertically adjustable part carried by said frame and engageable with the upper edge of said bar for limiting the downward swinging of the front portion of the frame relative to said draft bar, and lifting means connected with the forward portion of said frame for lifting the latter and acting through said bracket for raising the rear portion of said draft bar.

16. A plow as defined in claim 15, further characterized by said adjustable part comprising a member pivotally mounted on the plow frame and having a portion adapted to engage and serve as a stop for said bar, and means for holding said member in position.

17. A plow comprising a plow frame, one or more furrow openers connected thereto, a draft bar pivotally connected at its rear end to said frame generally above said openers and rearwardly of the forward end of said frame for movement relative to the latter about a transverse axis, means fixedly carried by said frame and providing upper and lower stops disposed forwardly of the axis of relative movement between said frame and said draft bar, said stops being disposed in a position to engage said draft bar for limiting the up and down movement of the forward portion of said frame relative to said draft bar about said transverse axis, and lifting means connected with the forward portion of said frame, forwardly of said axis, for lifting said frame and acting through said lower stop for raising the rear portion of said draft bar when the plow frame is raised.

References Cited in the file of this patent

UNITED STATES PATENTS

| | | |
|---|---|---|
| 1,397,146 | Ruedy | Nov. 15, 1921 |
| 1,429,048 | Schlagel | Sept. 12, 1922 |
| 1,971,180 | Graham et al. | Aug. 21, 1934 |
| 2,207,087 | Chaney | July 9, 1940 |
| 2,342,306 | Silver | Feb. 22, 1944 |
| 2,403,360 | Graham | July 2, 1946 |
| 2,440,550 | Martin | Apr. 27, 1948 |
| 2,518,215 | Wright | Aug. 8, 1950 |
| 2,518,363 | Orelind | Aug. 8, 1950 |
| 2,604,834 | Silver et al. | July 29, 1952 |